United States Patent
Bhat

(10) Patent No.: US 12,013,690 B2
(45) Date of Patent: Jun. 18, 2024

(54) METHOD AND SYSTEM FOR CONTROLLING A PROCESS IN A PROCESS PLANT

(71) Applicant: ABB Schweiz AG, Baden (CH)

(72) Inventor: Shrikant Bhat, Nagpur (IN)

(73) Assignee: ABB Schweiz AG, Baden (CH)

( * ) Notice: Subject to any disclaimer, the term of this patent is extended or adjusted under 35 U.S.C. 154(b) by 461 days.

(21) Appl. No.: 17/418,830

(22) PCT Filed: Dec. 26, 2019

(86) PCT No.: PCT/IB2019/061363
§ 371 (c)(1),
(2) Date: Jun. 27, 2021

(87) PCT Pub. No.: WO2020/136597
PCT Pub. Date: Jul. 2, 2020

(65) Prior Publication Data
US 2022/0066425 A1 Mar. 3, 2022

(30) Foreign Application Priority Data
Dec. 28, 2018 (IN) .............................. 201841049702

(51) Int. Cl.
G05B 19/418 (2006.01)
(52) U.S. Cl.
CPC ............... *G05B 19/4188* (2013.01); *G05B 2219/32007* (2013.01); *G05B 2219/33034* (2013.01); *G05B 2219/33273* (2013.01)
(58) Field of Classification Search
CPC ...... G05B 19/4188; G05B 2219/32007; G05B 2219/33034; G05B 2219/33273; G05B 19/418; Y02P 90/02
See application file for complete search history.

(56) References Cited

U.S. PATENT DOCUMENTS

2014/0142766 A1   5/2014  Tiwari et al.
2017/0322536 A1*  11/2017  Pandiyath ............. G06Q 10/06
(Continued)

FOREIGN PATENT DOCUMENTS

EP        3244277 A1    11/2017

OTHER PUBLICATIONS

Indian Patent Office, International Search Report for IN201841049702, Aug. 18, 2020, 6 pages.
(Continued)

*Primary Examiner* — Christopher E. Everett
(74) *Attorney, Agent, or Firm* — Leydig, Voit & Mayer, Ltd.

(57) ABSTRACT

The present invention relates to a method and a system for controlling a process of a process plant. Hie system is configured to control a process in the process plant by recommending control operations and perform the control operations. The system obtains the control operations and detects availability of control room operators using historical data related to actions performed by the control room operators, sensory parameters of the control room operators and a status associated with the process. The system provides queries related to the control operations, the plant parameters, status of the process to the control room operators upon detecting the availability. Hie queries are validated by the control room operators. The system thereafter autonomously controls tire control room based on the validated data.

13 Claims, 3 Drawing Sheets

(56) References Cited

U.S. PATENT DOCUMENTS

2019/0188378 A1* 6/2019 Eltoft .................... G06F 21/554
2020/0133211 A1* 4/2020 Lee ..................... H04N 21/4665
2022/0030108 A1* 1/2022 Premkumar ........ H04M 3/4938

OTHER PUBLICATIONS

European Patent Office, International Search Report for PCT/IB2019/061363, May 18, 2020, 3 pages.
European Patent Office, Written Opinion for PCT/IB2019/061363, May 18, 2020, 6 pages.

* cited by examiner

METHOD AND SYSTEM FOR CONTROLLING A PROCESS IN A PROCESS PLANT

CROSS-REFERENCE TO RELATED APPLICATIONS

This application is a U.S. national stage of International Application Serial No. PCT/IB2019/061363, filed Dec. 26, 2019, which claims priority to Indian Patent Application No. 201841049702, filed Dec. 28, 2018. The entire disclosures of both of the foregoing applications are incorporated herein by reference.

TECHNICAL FIELD

The current invention relates in general to industrial plants/process plants and more particularly to autonomously controlling a process of a process plant.

BACKGROUND

Industrial plants/process plants are controlled using control systems like Distributed Control System (DCS). The process plants comprise a control room to monitor processes and equipment in the process plant. The control room comprises a plurality of monitors, consoles, etc., to monitor the processes and equipment. One or more control room operators observe process parameters on the monitors and perform appropriate actions using the consoles to control the processes in the process plant.

Modern control rooms use Artificial Intelligence (AI) to automate the control room operations. AI are interconnected networks which require a huge amount of data set for training models. Few of the existing techniques do not consider expertise of the control room operator, i.e., the existing AI models do not consider intelligence of the control room operator for training the models.

Few other existing techniques receive constant feedback from the control room operators to train the models. However, the control room operators are often not available to provide the feedback. Further, an inexperienced control room operator may provide feedback which may vary from feedback provided by an experienced control room operator.

In view of the above, there is a need to address at least one of the abovementioned limitations and propose a method and system to overcome the abovementioned problems.

SUMMARY OF THE INVENTION

In an embodiment the present invention relates to a method and a system for controlling a process of a process plant. In an embodiment, controlling the process may be performed in an autonomous manner. In an embodiment, the system is a Distributed Control System (DCS). The DCS is configured to control at least one process in the process plant. The process plant comprises at least one control room to monitor the plant parameters associated with the at least one process. The DCS is also configured in the at least one control room. The DCS is configured to recommend one or more control operations and perform the recommended one or more control operations to control the at least one process. The DCS performs the following method steps to autonomously control the at least one process. The DCS obtains the recommended one or more control operations. Further, the DCS detects availability of one or more control room operators using historical data related to one or more actions performed by the one or more control room operators, one or more sensory parameters of the one or more control room operators and a status associated with the at least one process. The DCS provides one or more queries related to the recommended one or more control operations, the plant parameters, status of the process to the one or more control room operators upon detecting the availability. The one or more queries are validated by the one or more control room operators. The DCS thereafter autonomously controls the control room based on the validated data.

In an embodiment, the DCS comprises an Artificial Intelligence (AI) model to recommend the one or more control operations. In an embodiment, the validation is performed to train the AI model.

In an embodiment, the availability is determined to receive validation from experienced control room operators. Further, the availability is determined to request validation when the one or more control operators are not involved in controlling the at least one process.

In an embodiment, the DCS comprises one or more imaging units to capture the one or more sensory parameters of the one or more control room operators. The one or more sensory parameters comprises facial expressions, an eye gaze, and a body movement of the one or more control room operators.

Systems of varying scope are described herein. In addition to the aspects and advantages described in this summary, further aspects and advantages will become apparent by reference to the drawings and with reference to the detailed description that follows.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

The present invention discloses a method and a system for migrating process data from legacy historians to primary historians. Additionally, the present invention discloses a method and a system for retrieving process data from legacy historians to primary historian.

Figure 1:
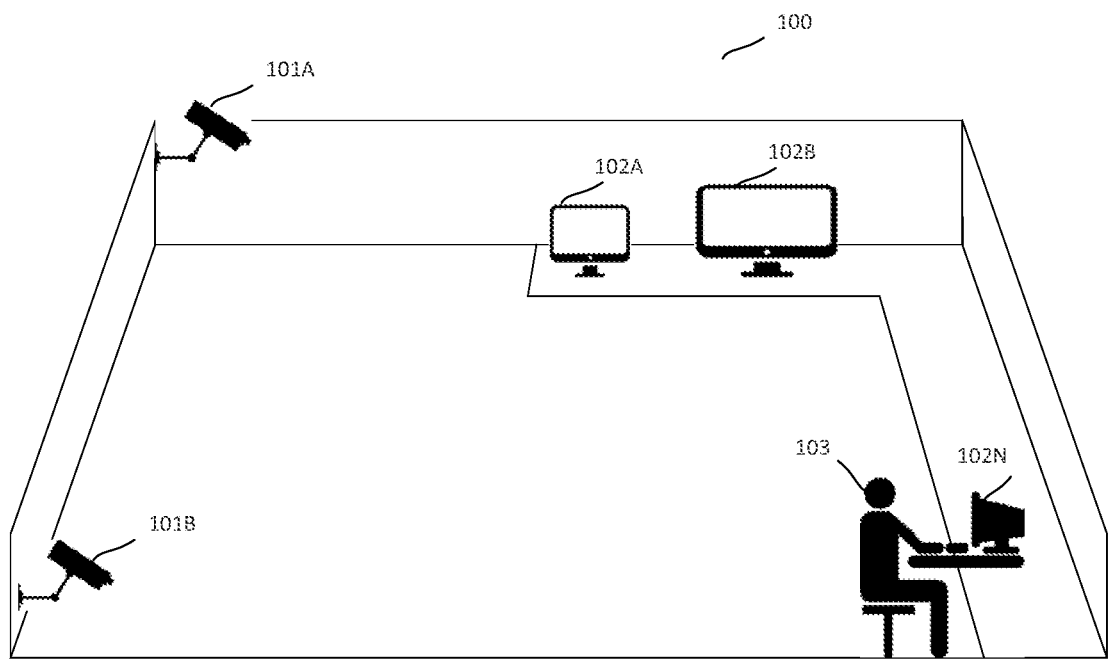
FIG. 1 illustrates a simplified block diagram of a control room, in accordance with an embodiment of the present disclosure.

FIG. 1 shows a simplified diagram of a control room (100) in a process plant, in an embodiment an industrial plant or a power plant can be considered in place of the process plant. The foregoing disclosure is described with respect to the process plant. However, it should not be construed as a limitation. A person of ordinary skill in the art will appreciate that aspects which are applicable to the industrial plant or power plant falls within the scope of this invention. The process plant can comprise a plurality of control rooms. The present disclosure is described with reference to one control room (100). The control room (100) comprises a plurality of display units (102A ... 102N) to monitor plant parameters related to at least one process in the process plant. The display units (102A ... 102N) can also display parameters related to a plurality of equipment in the process plant. For example, the display units (102A ... 102N) can display a condition of the plurality of equipment. The control room (100) further comprises one or more imaging units (101A ... 101N) for monitoring the control room (100), such as the display units (102A ... 102N) and one or more control room operators (103). The one or more control room operators (103) can be experienced operators. The one or more control room operators (103) perform one or more control operations to control the at least one process. For example, the one or more control room operators (103) provide key inputs to maintain temperature of an ongoing process. In an embodiment, the control room (100) comprises consoles (not shown) to provide inputs. In one embodiment, the consoles can include, keyboard, keypad, and the like.

Figure 2:
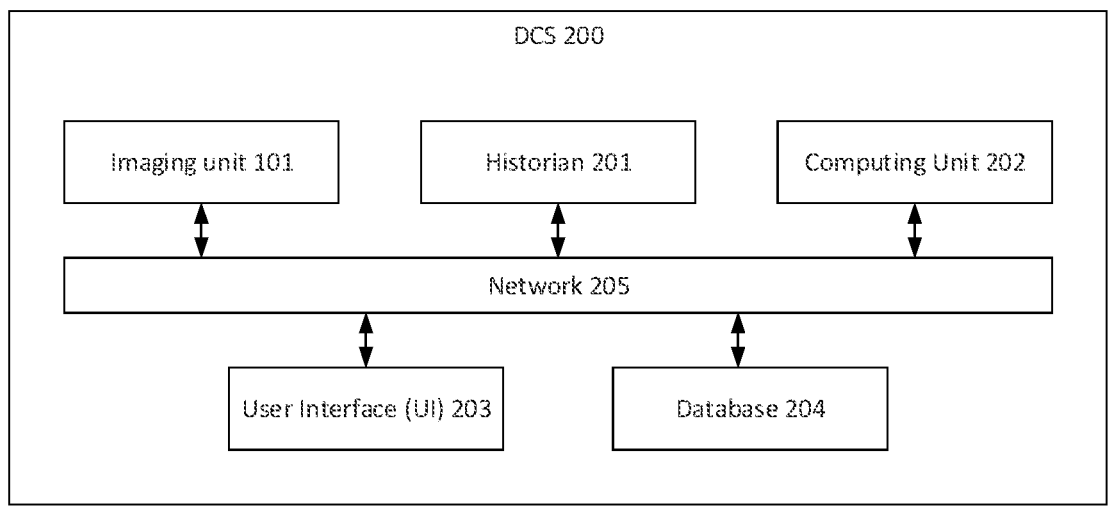
FIG. 2 illustrates an exemplary block diagram of a DCS, in accordance with an embodiment of the present disclosure.

Referring to FIG. 2, an exemplary block diagram of a DCS (200) is shown. The DCS (200) is configured in the control room (100). However, the DCS (200) can be configured in other areas of the process plant as well. In an embodiment, the plurality of equipment in the control room (100) can form a part of the DCS (200). For example, the one or more imaging units (101A ... 101N) and the one or more display units (102A ... 102N).

The DCS (200) comprises the one or more imaging units (101A ... 101N). The one or more imaging units (101A ... 101N) can be collectively denoted as one or more imaging units (101). The DCS (200) further comprises a historian (201), a computing unit (202), a user interface (203), a database (204) and a network (205).

The one or more imaging units (101) are configured to capture a plurality of images or video of the control room (100), in one embodiment, the one or more imaging units (101) are configured to capture a plurality of images or video of the one or more control room operators (103). The captured one or more images or video of the one or more control room operators (103) are stored along with a timestamp in the historian (201). In an embodiment, image processing techniques can be sued to process the one or more images or videos captured using the one or more imaging units (101).

The database (204) comprises the plurality of plant parameters, data related to the at least one process, data related to the plurality of equipment used in the at least one process, and the like.

In an embodiment, the UI (203) is configured to interact with the one or more control room operators (103). In one embodiment, the UI (203) is configured to provide queries to the one or more control room operators (103) for validating the recommended one or more control operations. In on embodiment, the UI (203) is configured to receive inputs from the one or more control room operators (103) to validate the one or more control operations.

In an embodiment, the computing unit (202) is configured to determine availability of the one or more control room operators (103) and enable the UI (203) to provide queries to the one or more control room operators (103) during their availability. The computing unit (202) can comprise the AI model configured to recommend the one or more control operations. In an embodiment, the AI model can use predictive techniques to recommend the one or more control operations. In an embodiment, the one or more control operations are recommended upon detecting an anomaly in one or more of the plurality of process parameters. The computing unit (202) obtains the one or more control operations, the plurality of process parameters and a status associated with the at least one process. Further, the computing unit (202) is configured to prepare queries that are used to validate if the recommended one or more control operations are correct. If the one or more control operations are validated as correct, the recommended control operations are used subsequently by the DCS (200) to autonomously control the at least one process.

In an embodiment, the components of the DCS (200) are connected vis the network (205). In an embodiment, the DCS (200) may be disposed in communication with the network (205) via a network interface. The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The network (205) may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc.

In an embodiment, the computing unit (202) can include but is not limited to a server, a supercomputer, a workstation, a laptop or any other electronic device capable of performing the method as described below in FIG. 3.

Figure 3:
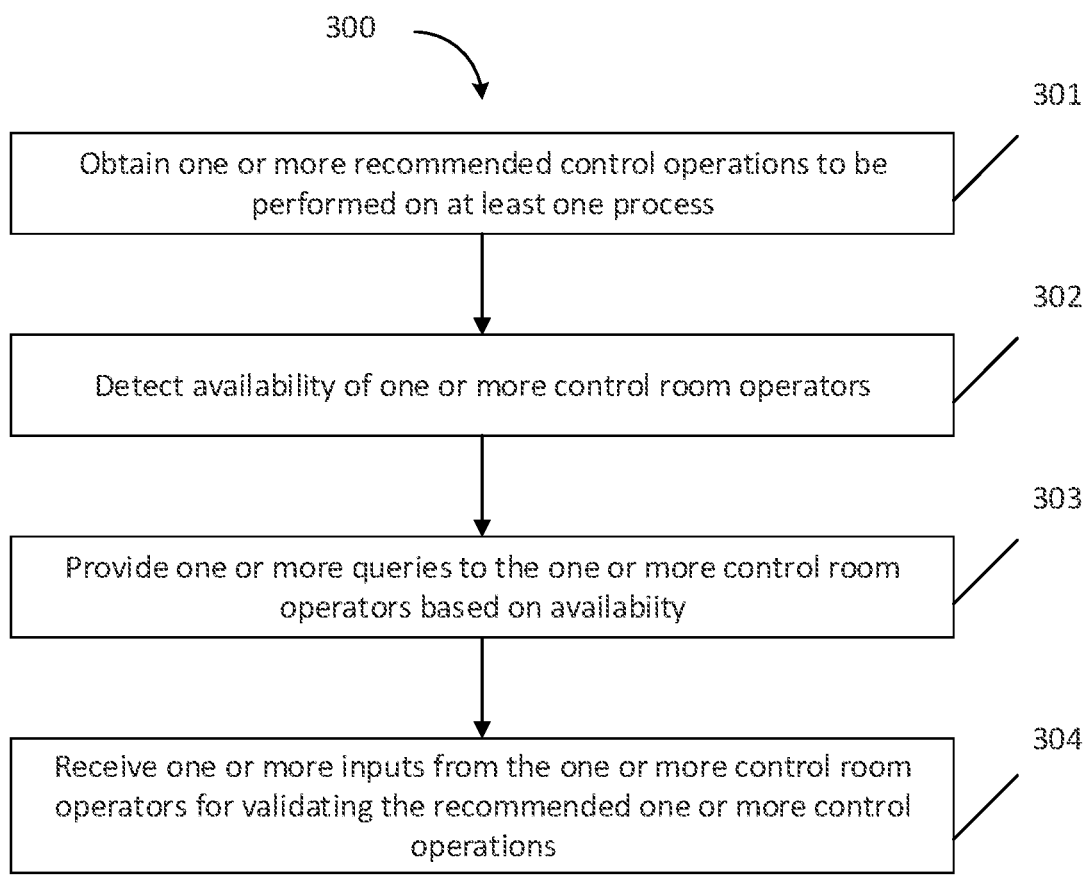
FIG. 3 illustrates an exemplary flow chart for controlling a process in a process plant, in accordance with an embodiment of the present disclosure.

FIG. 3 illustrates a flowchart (300) for controlling a process in a process plant. At step 301, the computing unit (202) obtains the one or more control operations recommended by the AI model. In an embodiment, the one or more control operations can be obtained from the database (204) or can be obtained from internal memory of the computing unit (202).

At step 302, the computing unit (202) detects availability of the one or more control room operators (103). The computing unit (202) retrieves historical data related to the one or more control room operators (103) from the historian (201). For example, the historical data comprises routine control operations performed by the one or more control room operators (103). The historical data can be used to predict when the one or more control room operators (103) will be available to validate one or more control operations. In an embodiment, one of the aspect of the present invention is not to involve the one or more control room operators (103) while controlling the at least one process.

In an embodiment, the availability is determined further based on one or more sensory parameters of the one or more control room operators (103). For example, if the one or more control room operators (103) are involved in controlling the at least one process, the computing unit (202) determines that the one or more control room operators (103) are unavailable. Further, the computing unit (202) obtains a status associated with the at least one process from the database (204) or can obtain the status in real-time using sensors (not shown) of the DCS (200). For example, if the at least one process does not require controlling, then a status is accordingly associated with the at least one process. One such example is a step in a batch process manufacturing where the batch content, after completion, need to be unloaded to storage tank.

In an embodiment, the computing unit (202) is configured to generate one or more queries related to the recommended one or more control operations. For example, the computing unit (202) can generate a query asking the control room operator if varying a particular set of process parameters will control the process. Likewise, queries cab be related to one or more process parameters observed or modified by the one or more control room operators (103). For example, if an alarm is initiated due to an issue in the process, the control room operators (103) take various measures to resolve the issue. The control room operators (103) observe various process parameters and vary/modify various process parameters. The imaging units (101) are used to detect eye movement or hand movement or a movement in any part of the body of the one or more control room operators (103). Also, the computing unit (202) determine changes in the process parameters simultaneously as the imaging unit (101) detects movement of the one or more control room operators (103). Further, the computing unit (202) correlates the eye movement and the changes in the process parameters to identify the control operations performed by the one or more control room operators (103) to control the process.

At step 303, UI (203) provides one or more queries to the one or more control room operators (103) at the determined available time. One example of such queries is to show different sequence of opetions of events, as perceived by AI algorithm, for validation by operator.

At step 304, the UI (203) receives one or more inputs from the one or more control room operators (103) validating the one or more queries. In an embodiment, the validation is a key input for the learning of the AI model. Based on the learning, the one or more control operations are predicted subsequently. For example, consider a query is provided to the operator requesting the operator to validate a control operation to be performed to control a process. The operator can input that the control operation recommended is not suitable along with reasons. The AI model considers the input as learning to improve the AI model. Subsequently, for the same process, the previously recommended control operation may not be recommended. In another example, if the operator approves that the control operation is valid for controlling the process, the AI model records the approval from the operator and may suggest similar control operations for controlling the process subsequently.

Figure 4:
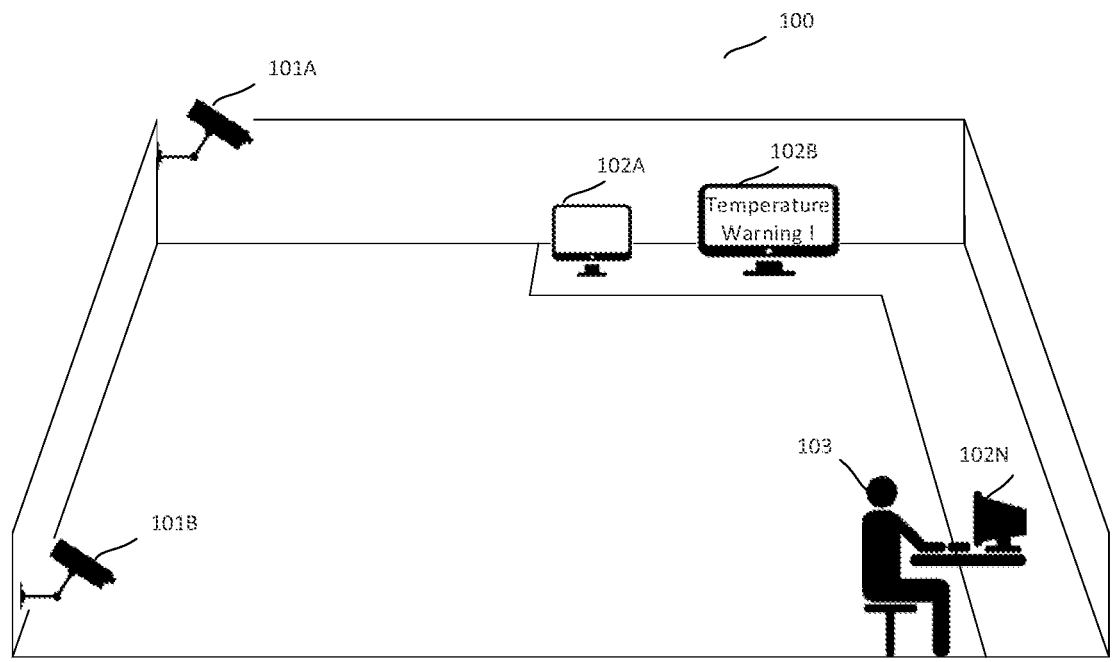
FIG. 4 and FIG. 5 illustrate an exemplary environment of the control room for controlling a process in a process plant, in accordance with an embodiment of the present disclosure.

Referring to FIG. 4, an example is provided to illustrate the working of the invention. As seen in FIG. 4, the display unit (102B) indicates a temperature warning in a process. The temperature warning could occur due to various reasons. The plurality of process parameters associated with the process are displayed on the display units (102A . . . 102N). Upon noticing the temperature warning, the control room operator may take various measures to contain the warning. For example, the control room operator may observe a first set of parameters in the display unit (102A) and vary a second set of parameters in the display unit (102N). The one or more imaging units (101) are configured to capture images/video of the control room operator as the operator performs the control operations to control the process. For example, the eye movement of the operator observing the display unit (102A) and the hand movement varying the parameters shown in display unit (102N) are recorded. A correlation between the eye movement, hand movement and the parameters varied are used to determine by the DCS (200) what parameters are observed and what actions are performed by the control room operator to control the process.

Figure 5:
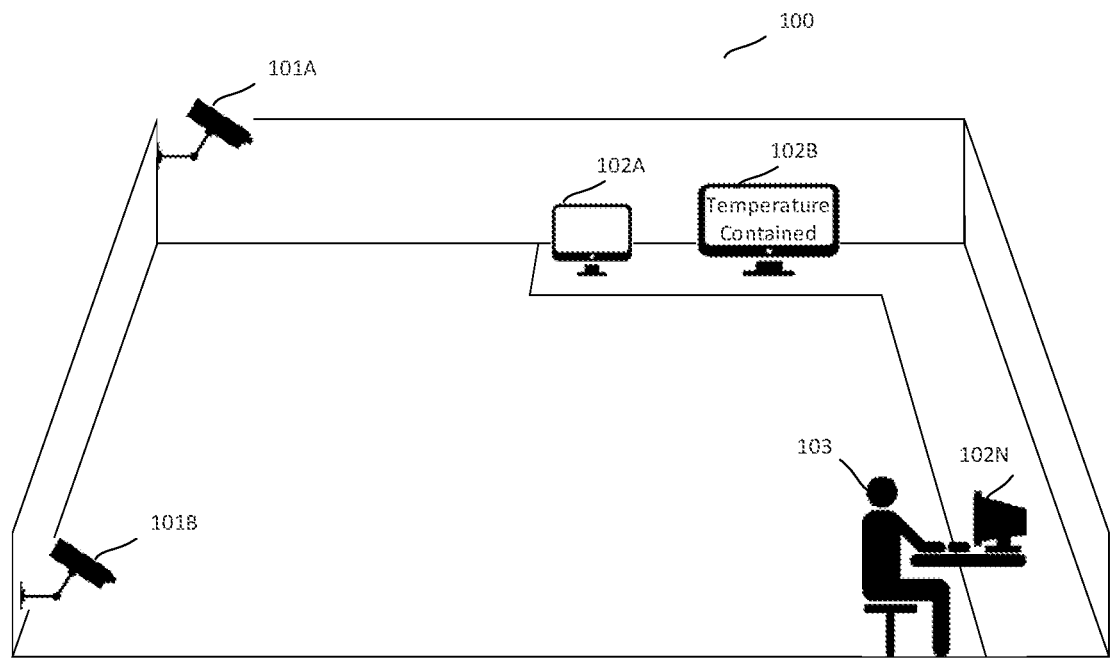

FIG. 5 shows a diagram illustrating a contained temperature in the process of the process plant. As seen, the temperature is contained upon the operator performing control operations. In an embodiment, the control operations are recorded by the DCS (200) and estimations and implications made by the AI model in the DCS (200) are provided to the operator for validation.

In an embodiment, each of the plurality of plant parameters is provided a priority index based on an impact on the at least one process. The at least one plant parameter having highest priority index is identified to be included in the one or more queries. In an embodiment, an experienced plant operator may want to receive specific parameters in the one or more queries, that impact the process. Hence, each parameter is prioritized based on the impact of that parameter on the process.

In one embodiment, the recommended one or more operations are selected from a plurality of operations. The the selection is based on a priority index associated with each operation. In an embodiment, the computing unit (202) can prioritize each operation based on impact of that operation on the process. Thus, one or more operations having highest impact on the process are selected and are recommended to the one or more control room operators (103). In an embodiment, the one or more queries can be provided to the one or more control room operators (103) at specific time intervals. For example, if the computing unit (202) is aware that a control room operator will be at leisure from 11 am-11:15 am on a particular day, the one or more queries can be provided to the operator at that time for validation.

In an embodiment, selected control rom operators (103) may be requested to validate the one or more queries. For example, only experienced operators can be requested to validate the queries.

In an embodiment, the present invention provides a method and system to improve the AI model for autonomously control the process by validating the recommended control operations during available time of the control room operators.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERRAL NUMERALS

101—Imaging units;
102—Display units;
103—Control room operators;
201—Historian;
202—Computing unit;
203—UI;
204—Database;
205—Network;

I claim:

1. A method of controlling a process with a distributed control system (DCS) of a process plant, wherein the DCS is configured to operate in at least a control room in the process plant, for controlling a plurality of plant parameters associated with at least one process, wherein the DCS is trained to monitor one or more control room operators and one or more actions performed by the one or more control room operators on the plurality of plant parameters, for providing recommendations and performing one or more control operations to control the at least one process in the process plant, wherein the method is performed by the DCS, the method comprising:

obtaining the recommended one or more control operations to be performed to control the at least one process based on an artificial intelligence (AI) model;
detecting availability of the one or more control room operators based on historical data related to the one or more actions performed by the one or more control room operators, one or more sensory parameters of the one or more control room operators and a status associated with the at least one process;
providing one or more queries to the one or more control room operators upon detecting the availability of the one or more control room operators, wherein the one or more queries are related to at least one plant parameter from the plurality of plant parameters being at least one of, observed and modified by the one or more control room operators, the recommended control operations, and the status of the at least one process;
receiving one or more inputs from the one or more control room operators for validating the recommended one or more control operations, wherein a training set for the DCS to control the at least one process comprises the validated one or more control operations; and
training the AI model based on the training set.

2. The method as claimed in claim 1, wherein the one or more inputs for the recommended control operations are provided by one or more field operators along with the one or more control room operators.

3. The method as claimed in claim 1, wherein the one or more sensory parameters are obtained from one or more imaging units of the DCS.

4. The method as claimed in claim 3, wherein the one or more sensory parameters comprises at least one of a facial expression, an eye gaze, and a body movement of the one or more control room operators.

5. The method as claimed in claim 1, wherein each of the plurality of plant parameters is provided a priority index based on an impact on the at least one process, wherein at least one plant parameter having highest priority index is identified to be included in the one or more queries.

6. The method as claimed in claim 1, wherein the recommended one or more control operations are selected from a plurality of operations, wherein the selection is based on a priority index associated with each operation.

7. The method as claimed in claim 1, wherein the recommended one or more control operations are provided to the one or more control room operators at defined time intervals.

8. A Distributed Control System (DCS) for controlling a process in a process plant, wherein the DCS is configured to operate in at least a control room in the process plant, for controlling a plurality of plant parameters of at least one process, wherein the DCS is configured to monitor one or more control room operators and one or more actions performed by the one or more control room operators, recommend one or more control operations to control the at least one process in the process plant, and perform the one or more control operations for controlling the at least one process, wherein the DCS comprises:
a historian configured to store historical data related to the one or more actions performed by the one or more control room operators;
a computing unit configured to:
receive the historical data and one or more sensory parameters;
obtain the recommended one or more control operations based on an artificial intelligence (AI) model;
detect an availability of the one or more control room operators based on the historical data, the one or more sensory parameters of the one or more control room operators and a status associated with the at least one process;
train the AI model based on a training set and a User Interface (UI) configured to:
provide one or more queries to the one or more control room operators upon receiving instructions from the computing unit, wherein the computing unit provides the instructions upon detecting the availability of the one or more control room operators, wherein the one or more queries are related to at least one plant parameter from the plurality of plant parameters being at least one of, observed and modified by the one or more control room operators, the recommended control operations, and the status of the at least one process; and
receive one or more inputs from the one or more control room operators, wherein the computing unit receives the one or more inputs from the one UI for validating the recommended control operations, wherein the training set for the DCS to control the at least one process comprises the validated control operations.

9. The DCS as claimed in claim 8, wherein the UI receives the one or more inputs from one or more field operators along with the one or more control room operators.

10. The DCS as claimed in claim 8, wherein the computing unit receives the one or more sensory parameters from one or more imaging units of the DCS.

11. The DCS as claimed in claim 8, wherein the computing unit provides a priority index to each of the plurality of plant parameters based on an impact on the at least one process, wherein at least one plant parameter having highest priority index is identified to be included in the one or more queries.

12. The DCS as claimed in claim 8, wherein the computing unit is configured to select the recommended one or more control operations from a plurality of operations, wherein the selection is based on a priority index associated with each operation.

13. The DCS as claimed in claim 8, wherein the computing unit is configured to provide the recommended one or more control operations to the one or more control room operators at defined time intervals.

* * * * *